(12) United States Patent
Marsala

(10) Patent No.: US 9,522,592 B2
(45) Date of Patent: Dec. 20, 2016

(54) FUEL SYSTEM VENTING CONFIGURATION

(71) Applicant: GM Global Technology Operations LLC, Detroit, MI (US)

(72) Inventor: Vincent J. Marsala, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 14/190,503

(22) Filed: Feb. 26, 2014

(65) Prior Publication Data

US 2015/0239338 A1     Aug. 27, 2015

(51) Int. Cl.
*B60K 15/03* (2006.01)
*B60K 15/035* (2006.01)

(52) U.S. Cl.
CPC ... *B60K 15/03006* (2013.01); *B60K 15/03519* (2013.01); *B60K 2015/03026* (2013.01); *B60K 2015/03282* (2013.01); *B60K 2015/03523* (2013.01); *Y10T 137/86324* (2015.04)

(58) Field of Classification Search
CPC ............. Y10T 137/3099; Y10T 137/86324; Y10T 137/86332; Y10T 137/8634; Y10T 137/86348; B60K 2015/03006; B60K 2015/03026;B60K 2015/03263; B60K 2015/03282; B60K 2015/03289; B60K 2015/03523; B60K 2015/03528
USPC ........................................................ 137/587
See application file for complete search history.

(56) References Cited

U.S. PATENT DOCUMENTS

| | | | | |
|---|---|---|---|---|
| 4,742,840 A | * | 5/1988 | Takahashi | B60K 15/03519 137/43 |
| 5,066,393 A | * | 11/1991 | Padera | B01D 24/14 137/590 |
| 5,947,153 A | * | 9/1999 | Bucci | B60K 15/04 137/587 |
| 6,607,005 B2 | * | 8/2003 | Viebahn | B60K 15/077 123/510 |
| 6,957,658 B2 | * | 10/2005 | Aschoff | B60K 15/035 137/202 |
| 2015/0210528 A1 | * | 7/2015 | Marsala | B67D 7/048 141/5 |

* cited by examiner

*Primary Examiner* — Matthew W Jellett
(74) *Attorney, Agent, or Firm* — BrooksGroup

(57) ABSTRACT

A number of variations may include a fuel tank, a first vapor line having a first open end, a second vapor line having a second open end, a valve including a check valve, a vent outlet, and wherein the first vapor line and second vapor line may be in fluid communication with the valve and the vent outlet and may be constructed and arranged to allow fluid to flow from the valve, through the first or second vapor line, or the first or second open end, or the vent outlet.

12 Claims, 1 Drawing Sheet

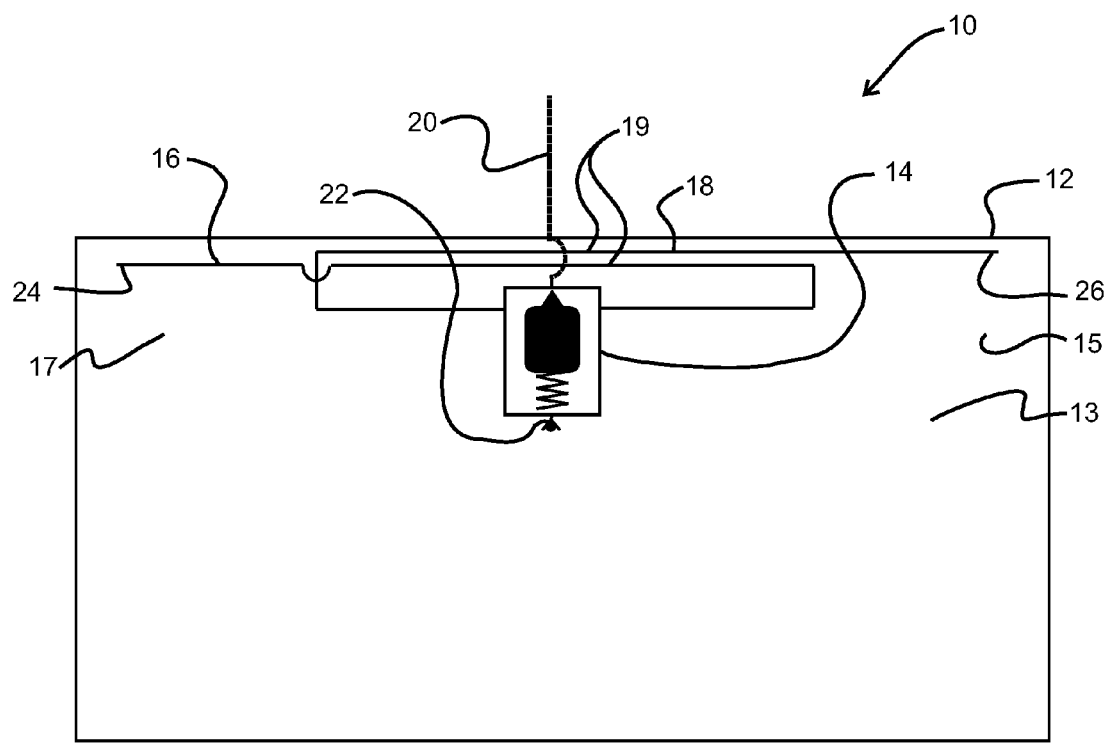

FUEL SYSTEM VENTING CONFIGURATION

TECHNICAL FIELD

The field to which the disclosure generally relates to includes automobile fuel tank venting systems.

BACKGROUND

Fuel systems typically include multi-valve venting systems that allow venting of fuel vapors while a vehicle may be on various grades of road. Vent systems typically utilize valves having a check feature that may float shut when the fuel level rises in a portion of the fuel tank as the vehicle travels over various grades of road.

SUMMARY OF ILLUSTRATIVE VARIATIONS

A number of variations may include a fuel system venting configuration may include a fuel tank, a valve, a plurality of vapor lines, and a vent outlet.

A number of variations may include a fuel system venting configuration may include a fuel tank, a valve, a plurality of vapor lines, and a vent outlet. The valve may be a single sealed valve having an integral check valve which may be of an umbrella, duck-bill, or floated ball type. The plurality of vapor lines may be constructed and arranged to have open-ended vapor lines placed strategically to allow venting of fuel vapor. The fuel system venting configuration may be constructed and arranged to prevent fuel spillage from the fuel tank.

A number of variations may include a fuel system venting configuration may include a fuel tank, a valve, a plurality of vapor lines, and a vent outlet. The valve may be a single sealed valve having an integral check valve which may be of an umbrella or floated ball type. The plurality of vapor lines may be constructed and arranged to form a vapor line loop having open-ended vapor lines placed strategically to allow venting of fuel vapor from the fuel tank via the vent outlet. The fuel system venting configuration may be constructed and arranged to prevent fuel spillage from the fuel tank.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts a diagram of one variation.

DETAILED DESCRIPTION OF ILLUSTRATIVE VARIATIONS OF THE INVENTION

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Referring to FIGS. 1-3, in a number of variations, a fuel system venting configuration 10 may include a fuel tank 12 defining a cavity 13 and a first portion 15 and a second portion 17, a valve 14, a first vapor line 16 and a second vapor line 18, and a vent outlet 20. The valve 14 may be a single sealed valve having a check valve 22 which may be of an umbrella, duck bill, or floated ball type. The first vapor line 16 and second vapor line 18 may be constructed and arranged to have a first open end 24 and second open end 26, respectively, placed strategically to allow venting of fuel vapor. The first open end 24 may be disposed within the first portion 17 and the second open end 26 may be disposed within the second portion 15. The first vapor line 16 and second vapor line 18 may form a vapor line loop 19. The fuel system venting configuration may be constructed and arranged to prevent fuel spillage from the fuel tank.

The fuel tank may be any container for holding fuel such as in an automobile or similar vehicle.

The valve may be a single sealed valve having an integral check valve which may be of an umbrella or floated ball type. The valve may be in fluid communication with the plurality of fuel lines. The valve may be constructed and arranged to seal once fuel within the fuel tank has reached a certain value. In this way, the valve may be constructed and arrange to prevent fuel from entering the valve and the plurality of vapor lines.

The plurality of vapor lines may be in fluid communication with the valve and may be constructed and arranged to form a vapor line loop within the fuel tank wherein a first vapor line may allow fluid to flow from the valve to a first open end, and the second vapor line may allow fluid to flow from the valve to a second open end and wherein the first vapor line may cross over the second vapor line or vice versa.

The vent outlet may be in fluid communication with the valve or the plurality of vapor lines or both. The vent outlet may be constructed and arranged to allow fuel vapor to escape the fuel tank.

According to variation 1, a product may include a fuel tank, a first vapor line having a first open end, a second vapor line having a second open end, a valve including a check valve, a vent outlet; and wherein the first vapor line and second vapor line may be in fluid communication with the valve and the vent outlet and may be constructed and arranged to allow fluid to flow from the valve, through the first or second vapor line, or the first or second open end, or the vent outlet.

Variation 2 may include a product as set forth in variation 1 the first open end may be disposed within the fuel tank at a first location placed strategically to allow venting of fuel vapor from the fuel tank and the second open end may be disposed within the fuel tank at a second location placed strategically to allow venting of fuel vapor fuel tank.

Variation 3 may include a product as set forth in variation 2 wherein the first location is different from the second location.

Variation 4 may include a product as set forth in any of variations 1 through 3 the first vapor line and the second vapor line may be constructed and arranged to form a vapor line loop wherein the first vapor line may form a first vapor line path and the second vapor line may form a second vapor line path, the second vapor line path crossing over the first vapor line path or vice versa.

Variation 5 may include a product as set forth in any of variations 1 through 4 wherein the vapor line loop may be constructed and arranged to allow fuel vapor to vent from the cavity via the first open end, the second open end, or both wherein fuel vapor may flow from the first open end or second open end, through the first vapor line path or second vapor line path, through the valve, and through the vent outlet.

Variation 6 may include a product as set forth in any of variations 1 through 5 wherein the check valve may be an umbrella type check valve.

Variation 7 may include a product as set forth in any of variations 1 through 6 wherein the check valve may be a floated ball type check valve.

Variation 8 may include a product as set forth in any of variations 1 through 7 wherein the valve may be constructed and arranged to allow drainage of liquid from the valve.

Variation 8 may include a product that may include a fuel tank that may define a cavity, a valve that may include a check valve disposed within the cavity, a vent outlet that may include a third open end and may be in fluid communication with at least the valve, a first vapor line that may include a first open end and may be in fluid communication with both the valve and the cavity and may be constructed and arranged to allow fluid to flow from the valve, through the first vapor line, or the first end and extending from the valve into a second portion of the fuel tank to form a first partial loop such that the first open end may be within the first portion of the fuel tank, opposite the second portion of the fuel tank. A second vapor line may include a second open end and may be in fluid communication with both the valve and the cavity and may be constructed and arranged to allow fluid to flow from the valve, through the second vapor line, or the second end and extending from the valve into a first portion of the fuel tank to form a second partial loop such that the second open end may be disposed within the second portion of the fuel tank, opposite the first portion of the fuel tank.

Variation 10 may include a product as set forth in variation 9 wherein the first open end may be disposed within the fuel tank at a first location within the first portion of the fuel tank placed strategically to allow venting of fuel vapor and the second open end may be disposed within the fuel tank at a second location within the second portion of the fuel tank placed strategically to allow venting of fuel vapor.

Variation 11 may include a product as set forth in any of variations 9 through 10 wherein the third open end may extend outside of the cavity such that the vent outlet and valve are constructed and arranged to allow fuel vapor to flow outside of the cavity and the fuel tank.

Variation 12 may include a product as set forth in any of variations 9 through 11 wherein the check valve may be a duck-bill type check valve.

Variation 13 may include a product as set forth in any of variations 9 through 11 wherein the check valve may be a floated ball type check valve.

Variation 14 may include a product as set forth in any of variations 9 through 13 wherein the first vapor line and the second vapor line may be constructed and arranged to form a vapor line loop wherein the first vapor line may form a first vapor line path and the second vapor line may form a second vapor line path, the second vapor line path crossing over the first vapor line path.

Variation 15 may include a product as set forth in any of variations 1 through 13 wherein the vapor line loop may constructed and arranged to allow fuel vapor to vent from the cavity via the first open end, the second open end, or both wherein fuel vapor may flow from the first open end or second open end, through the first vapor line path or second vapor line path, through the valve, and through the vent outlet.

Variation 16 may include a product as set forth in any of variations 1 through 14 wherein the valve may be constructed and arranged to allow drainage of liquid from the valve.

Variation 17 may include a product that may include a fuel tank that may define a cavity, a valve that may include a check valve disposed within the cavity and may be constructed and arranged to allow drainage of liquid from the valve, a vent outlet that may include a third open end and may be in fluid communication with at least the valve. The third open end may extend outside of the cavity such that the vent outlet and valve are constructed and arranged to allow fuel vapor to flow outside of the cavity and the fuel tank. The product may further include a first vapor line that may include a first open end and may be in fluid communication with both the valve and the cavity and may be constructed and arranged to allow fluid to flow from the valve, through the first vapor line, or the first end and may extend from the valve into a second portion of the fuel tank to form a first partial loop such that the first open end may be disposed within the first portion of the fuel tank, opposite the second portion of the fuel tank, the first open end may be disposed within the fuel tank at a first location within the first portion of the fuel tank placed strategically to allow venting of fuel vapor. The product may further include a second vapor line that may include a second open end and may be in fluid communication with both the valve and the cavity and may be constructed and arranged to allow fluid to flow from the valve, through the second vapor line, or the second end and may extend from the valve into a first portion of the fuel tank to form a second partial loop such that the second open end may be disposed within the second portion of the fuel tank, opposite the first portion of the fuel tank, the second open end may be disposed within the fuel tank at a second location within the second portion of the fuel tank placed strategically to allow venting of fuel vapor. The first vapor line and the second vapor line may be constructed and arranged to form a vapor line loop wherein the first vapor line may form a first vapor line path and the second vapor line may form a second vapor line path, the second vapor line path crossing over the first vapor line path. The vapor line loop may be constructed and arranged to allow fuel vapor to vent from the cavity via the first open end, the second open end, or both wherein fuel vapor may flow from the first open end or second open end, through the first vapor line path or second vapor line path, through the valve, and through the vent outlet.

Variation 18 may include a product as set forth in variation 17 wherein the check valve may be a duck-bill type check valve.

Variation 19 may include a product as set forth in any of variations 17 through 18 wherein the check valve may be a floated ball type check valve.

The above description of variations within the scope of the invention is merely demonstrative in nature and, thus, variations thereof are not to be regarded as a departure from the spirit and scope of the invention.

What is claimed is:

1. A product comprising:
   a fuel tank;
   a first vapor line having a first open end;
   a second vapor line having a second open end;
   a vent outlet; and wherein the first vapor line and second vapor line are in fluid communication with not more than one valve and the vent outlet and are constructed and arranged to allow fluid to flow from the valve, through the first or second vapor line, or the first or second open end, or the vent outlet and wherein the first vapor line and the second vapor line are constructed and arranged to form a vapor line loop wherein the first vapor line forms a first vapor line path and the second vapor line forms a second vapor line path, the second vapor line path crossing over the first vapor line path or vice versa.

2. A product as set forth in claim 1, wherein:
the first open end is disposed within the fuel tank at a first location placed to allow venting of fuel vapor from the fuel tank and the second open end is disposed within the fuel tank at a second location placed to allow venting of fuel vapor fuel tank.

3. A product as set forth in claim 2, wherein:
the first location is different from the second location.

4. A product as set forth in claim 1, wherein the vapor line loop is constructed and arranged to allow fuel vapor to vent from a cavity via the first open end, the second open end, or both wherein fuel vapor flows from the first open end or second open end, through the first vapor line path or second vapor line path, through the valve, and through the vent outlet.

5. A product as set forth in claim 1, wherein the valve is constructed and arranged to allow drainage of liquid from the valve.

6. A product comprising:
a fuel tank defining a cavity;
a vent outlet comprising a third open end and being in fluid communication with at least the valve;
a first vapor line comprising a first open end and being in fluid communication with both not more than one valve and the cavity and being constructed and arranged to allow fluid to flow from the valve, through the first vapor line, or the first open end and extending from the valve into a second portion of the fuel tank to form a first partial loop such that the first open end is disposed within the first portion of the fuel tank, opposite the second portion of the fuel tank; and
a second vapor line comprising a second open end and being in fluid communication with both the valve and the cavity and being constructed and arranged to allow fluid to flow from the valve, through the second vapor line, or the second end and extending from the valve into a first portion of the fuel tank to form a second partial loop such that the second open end is disposed within the second portion of the fuel tank, opposite the first portion of the fuel tank.

7. The product as set forth in claim 6, wherein
the first open end is disposed within the fuel tank at a first location within the first portion of the fuel tank placed to allow venting of fuel vapor; and
the second open end is disposed within the fuel tank at a second location within the second portion of the fuel tank placed to allow venting of fuel vapor.

8. The product as set forth in claim 6, wherein the third open end extends outside of the cavity such that the vent outlet and valve are constructed and arranged to allow fuel vapor to flow outside of the cavity and the fuel tank.

9. A product as set forth in claim 6, wherein the first vapor line and the second vapor line are constructed and arranged to form a vapor line loop wherein the first vapor line forms a first vapor line path and the second vapor line forms a second vapor line path, the second vapor line path crossing over the first vapor line path.

10. A product as set forth in claim 9, wherein the vapor line loop is constructed and arranged to allow fuel vapor to vent from the cavity via the first open end, the second open end, or both wherein fuel vapor flows from the first open end or second open end, through the first vapor line path or second vapor line path, through the valve, and through the vent outlet.

11. A product as set forth in claim 6, wherein the valve is constructed and arranged to allow drainage of liquid from the valve.

12. A product comprising:
a fuel tank defining a cavity;
a vent outlet comprising a third open end and being in fluid communication with at least the valve, the third open end extending outside of the cavity such that the vent outlet and valve are constructed and arranged to allow fuel vapor to flow outside of the cavity and the fuel tank;
a first vapor line comprising a first open end and being in fluid communication with both not more than one valve being constructed and arranged to allow drainage of liquid from the valve and the cavity and being constructed and arranged to allow fluid to flow from the valve, through the first vapor line, or the first open end and extending from the valve into a second portion of the fuel tank to form a first partial loop such that the first open end is disposed within the first portion of the fuel tank, opposite the second portion of the fuel tank, the first open end being disposed within the fuel tank at a first location within the first portion of the fuel tank placed to allow venting of fuel vapor;
a second vapor line comprising a second open end and being in fluid communication with both the valve and the cavity and being constructed and arranged to allow fluid to flow from the valve, through the second vapor line, or the second end and extending from the valve into a first portion of the fuel tank to form a second partial loop such that the second open end is disposed within the second portion of the fuel tank, opposite the first portion of the fuel tank, the second open end being disposed within the fuel tank at a second location within the second portion of the fuel tank placed to allow venting of fuel vapor;
wherein the first vapor line and the second vapor line are constructed and arranged to form a vapor line loop wherein the first vapor line forms a first vapor line path and the second vapor line forms a second vapor line path, the second vapor line path crossing over the first vapor line path; and
wherein the vapor line loop is constructed and arranged to allow fuel vapor to vent from the cavity via the first open end, the second open end, or both wherein fuel vapor flows from the first open end or second open end, through the first vapor line path or second vapor line path, through the valve, and through the vent outlet.

* * * * *